E. Spalding. Cart Body Fastening.

116641

PATENTED JUL 4 1871

Witnesses:
John Becker.
Wm. H. C. Smith.

Inventor:
E. Spalding.

per
Attorneys.

UNITED STATES PATENT OFFICE.

ENOS SPALDING, OF PLAINFIELD, NEW HAMPSHIRE.

IMPROVEMENT IN CART-BODY FASTENINGS.

Specification forming part of Letters Patent No. 116,641, dated July 4, 1871.

*To all whom it may concern:*

Be it known that I, ENOS SPALDING, of Plainfield, in the county of Sullivan and State of New Hampshire, have invented a new and useful Improvement in Cart-Body Fastening; and I do hereby declare that the following is a full, clear, and exact description thereof, which will enable others skilled in the art to make and use the same, reference being had to the accompanying drawing forming part of this specification, in which—

Figure 1:
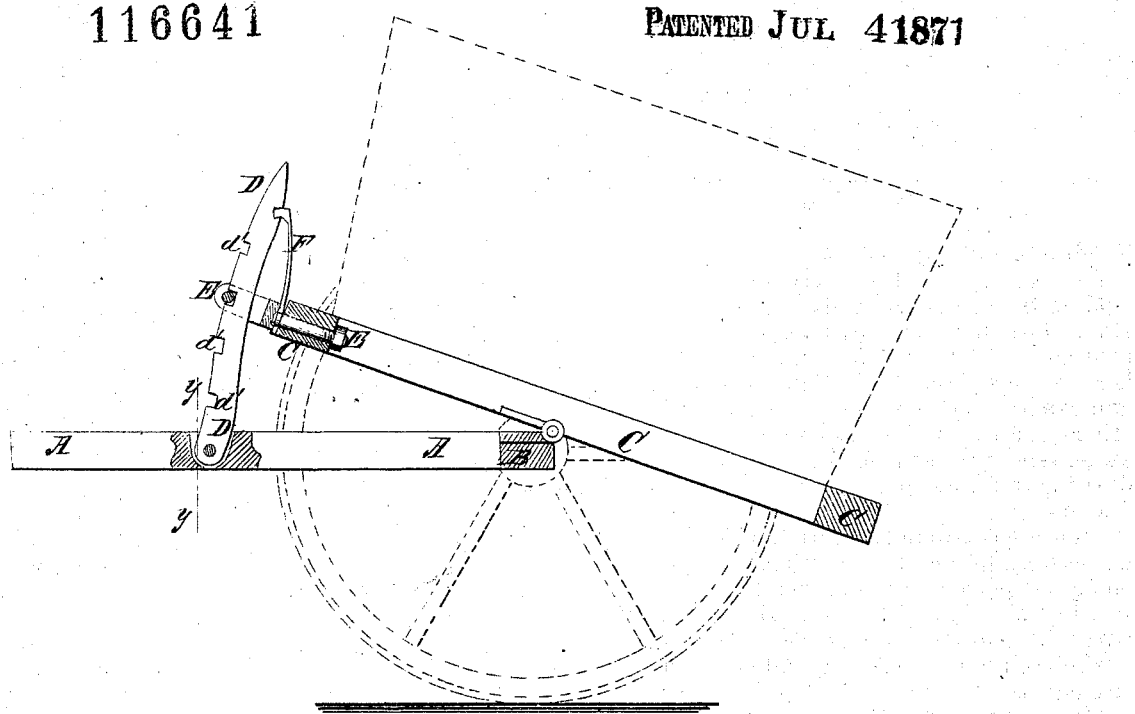
Figure 2:
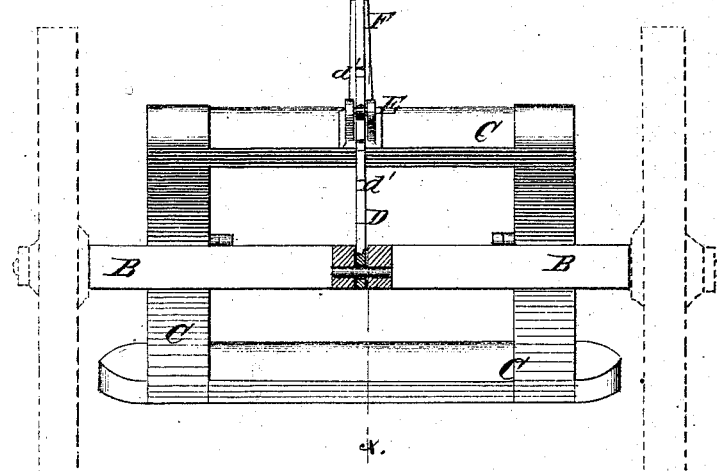

Figure 1 is a detail longitudinal section of the frame-work of a cart, to which my improved fastening has been attached, taken through the line $x$ $x$, Fig. 2. Fig. 2 is a front view of the same, partly in section, through the line $y$ $y$, Fig. 1.

Similar letters of reference indicate corresponding parts.

My invention has for its object to furnish an improved fastening for cart-bodies which shall be simple in construction, easily operated, and will hold the body securely in any position; and it consists in the fastening constructed and operating substantially as herein shown and described.

A represents the tongue, B the axle, and C the frame of the cart-body, which is hinged to the axle B in the ordinary manner. D is a slightly-curved or sword-shaped bar, the lower end of which enters a slot or mortise in the tongue A, and is pivoted to said tongue, as shown in Figs. 1 and 2. The bar D passes through a slot in the head of a bolt, E, that passes through and is secured to the front cross-bar of the frame C. In the forward edge of the bar D is formed one or more notches, $d'$, to catch upon the pin that passes through the forward end of the head of the bolt E. The lower notch $d'$ should be in the proper position to hold the cart-body level, or nearly so, and the other notches $d'$ may be in position to hold the cart-body at any desired inclination. F is a spring, the lower end of which is secured to the front cross-bar of the frame C by the bolt E, which passes through a hole in the end of the said spring. The upper end of the spring F has side lugs formed upon it, or a groove formed in it, to receive the rear edge of the bar D, to keep the said spring in place against the rear edge of the said bar as the cart-body moves upon its pivots.

With this construction, when it is desired to move the forward end of the frame C up or down to dump the cart, or bring it back to its former position, the upper end of the bar D is pushed to the rearward against the spring F sufficiently to free its notched edge from the cross-pin in the slotted head of the bolt E, when the frame C may be moved up and down, as may be desired.

Having thus described my invention, I claim as new and desire to secure by letters Patent—

The pivoted bar D, having one or more notches, $d'$, formed in its forward end, bolt E having a long slotted projecting head, and spring, F, said parts being constructed and arranged to operate in connection with the frame-work of a cart, substantially as herein shown and described, and for the purpose set forth.

ENOS SPALDING.

Witnesses:
J. W. SPALDING,
F. J. SPENCER.